United States Patent
Hasegawa (10) Patent No.: US 7,551,214 B2
(45) Date of Patent: Jun. 23, 2009

(54) PIXEL INTERPOLATION METHOD

(75) Inventor: Hiromu Hasegawa, Osaka (JP)

(73) Assignee: MegaChips LSI Solutions Inc., Osaka-shi (JP)

(*) Notice: Subject to any disclaimer, the term of this patent is extended or adjusted under 35 U.S.C. 154(b) by 530 days.

(21) Appl. No.: 11/275,009

(22) Filed: Dec. 1, 2005

(65) Prior Publication Data
US 2007/0126885 A1    Jun. 7, 2007

(51) Int. Cl.
  H04N 3/14     (2006.01)
  H04N 5/335    (2006.01)
  H04N 9/04     (2006.01)
  H04N 9/083    (2006.01)
  G06K 9/00     (2006.01)

(52) U.S. Cl. .................... 348/280; 382/162

(58) Field of Classification Search ........... 382/167, 382/300, 162; 348/222.1, 272, 273, 280, 348/207.99; 358/525
See application file for complete search history.

(56) References Cited

U.S. PATENT DOCUMENTS

| | | | | |
|---|---|---|---|---|
| 5,552,827 A * | 9/1996 | Maenaka et al. | ............ | 348/266 |
| 5,805,217 A * | 9/1998 | Lu et al. | ............ | 348/273 |
| 6,563,538 B1 * | 5/2003 | Utagawa | ............ | 348/273 |
| 6,714,242 B1 * | 3/2004 | Kobayashi | ............ | 348/272 |
| 7,460,734 B2 * | 12/2008 | Chao | ............ | 382/300 |
| 2002/0001409 A1 * | 1/2002 | Chen et al. | ............ | 382/167 |
| 2005/0007470 A1 * | 1/2005 | Kimura et al. | ............ | 348/272 |
| 2005/0058361 A1 * | 3/2005 | Tajima | ............ | 348/222.1 |
| 2005/0073591 A1 * | 4/2005 | Ishiga et al. | ............ | 348/221.1 |
| 2005/0117040 A1 | 6/2005 | Matsutani | | |
| 2006/0050956 A1 * | 3/2006 | Tanaka | ............ | 382/162 |
| 2007/0126885 A1 | 6/2007 | Hasegawa | | |
| 2007/0247530 A1 * | 10/2007 | Takahasi et al. | ............ | 348/223.1 |

FOREIGN PATENT DOCUMENTS

JP    2005-159957    6/2005

OTHER PUBLICATIONS

U.S. Appl. No. 11/577,453, filed Apr. 18, 2007, Hasegawa, et al.
U.S. Appl. No. 11/275,009, filed Dec. 1, 2005, Hasegawa.
U.S. Appl. No. 11/288,118, filed Nov. 29, 2005, Hasegawa.
U.S. Appl. No. 12/269,354, filed Nov. 12, 2008, Hasegawa.

* cited by examiner

*Primary Examiner*—Lin Ye
*Assistant Examiner*—Jason Whipkey
(74) *Attorney, Agent, or Firm*—Oblon, Spivak, McClelland, Maier & Neustadt, P.C.

(57) ABSTRACT

Correlation values in the vertical direction, horizontal direction and two diagonal directions are obtained in a pixel signal of RGB Bayer pattern. The correlation values are calculated using G signals. Between a first pair of the vertical and horizontal directions and a second pair of the two diagonal directions, one pair having a greater correlation difference is selected. Then, a direction having a stronger correlation is selected in the selected pair having a greater correlation difference, and pixel interpolation is performed in the selected direction. Alternatively, pixel interpolation is performed following assignment of weights in two directions of the selected pair having a greater correlation difference in accordance with the proportion of their correlations.

14 Claims, 9 Drawing Sheets

PIXEL INTERPOLATION METHOD

BACKGROUND OF THE INVENTION

1. Field of the Invention

The present invention relates to a pixel interpolation method to be adapted in digital cameras or the like.

2. Description of the Background Art

A CCD imaging device for use in digital cameras or the like photoelectrically transfers light received through a color filter to output pixel data. Such color filter includes an RGB color filter, a YMCK color filter and the like. Through a single-chip color filter, single-color pixel data is output per pixel. For instance, when employing the RGB color filter, pixel data having one of R (red), G (green) and B (blue) color components is output per pixel.

Therefore, in the case of pixel data output from a CCD imaging device equipped with a single-chip color filter, single-color image data is output per pixel, and thus image data of other color components is to be interpolated. Various algorithms are used in the interpolation.

However, the interpolation is an operation of estimating pixel data of a target pixel from pixel data of neighboring pixels around the target pixel, and accordingly, misinterpolation may be performed depending on the contents of an image. Therefore, there is a technique for improving the interpolation accuracy in which the difference between G signals in the vertical direction and the difference between G signals in the horizontal direction are calculated to obtain correlations in the vertical and horizontal directions, respectively, thereby performing pixel interpolation in accordance with the correlations.

Japanese Patent Application Laid-Open Nos. 5-153562 (1993), 2001-94951 and 2003-230109 disclose a technique for evaluating correlations in diagonal directions in addition to a correlation in the vertical direction to perform pixel interpolation.

The above method is to improve the accuracy in pixel interpolation by evaluating the correlations in diagonal directions, but is a mere extension of the interpolation method using correlations in the vertical and horizontal directions, which therefore may cause misinterpolation in some cases.

SUMMARY OF THE INVENTION

An object of the present invention is to provide a technique for improving the interpolation accuracy in a pixel interpolation technology using a plurality of correlations.

The present invention is directed to a pixel interpolation method comprising a first step of inputting pixel data of a predetermined color space, a second step of obtaining a correlation of a pixel present in a first direction, a correlation of a pixel present in a second direction perpendicular to the first direction, a correlation of a pixel present in a third direction different from the first and second directions and a correlation of a pixel present in a fourth direction perpendicular to the third direction, using neighboring pixels around a target pixel, and a third step of performing pixel interpolation at the target pixel in at least one of the first to fourth directions using the four correlations in the first to fourth directions.

Preferably, in the pixel interpolation method, the third step includes the step of evaluating correlations of a peripheral region of the target pixel using the four correlations in the first to fourth directions, thereby performing the pixel interpolation at the target pixel in at least one of the first to fourth directions judged that the correlation is strong.

Preferably, in the pixel interpolation method, the third step includes the step of assigning weights in the first to fourth directions in accordance with a proportion of the correlations, thereby performing the pixel interpolation.

According to the invention, correlations in directions of a plurality of pairs of two directions perpendicular to each other are obtained using pixel data of a peripheral region of a target pixel, and interpolation is performed using these correlations as the basis for judgment. This allows interpolation to be performed with higher accuracy.

Since correlations in a plurality of diagonal directions are taken into account, the invention is also effective in the future case in which increasing number of imaging devices may have pixels arrayed in diagonal directions to create an octagonal or a dodecagonal pattern, for example.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
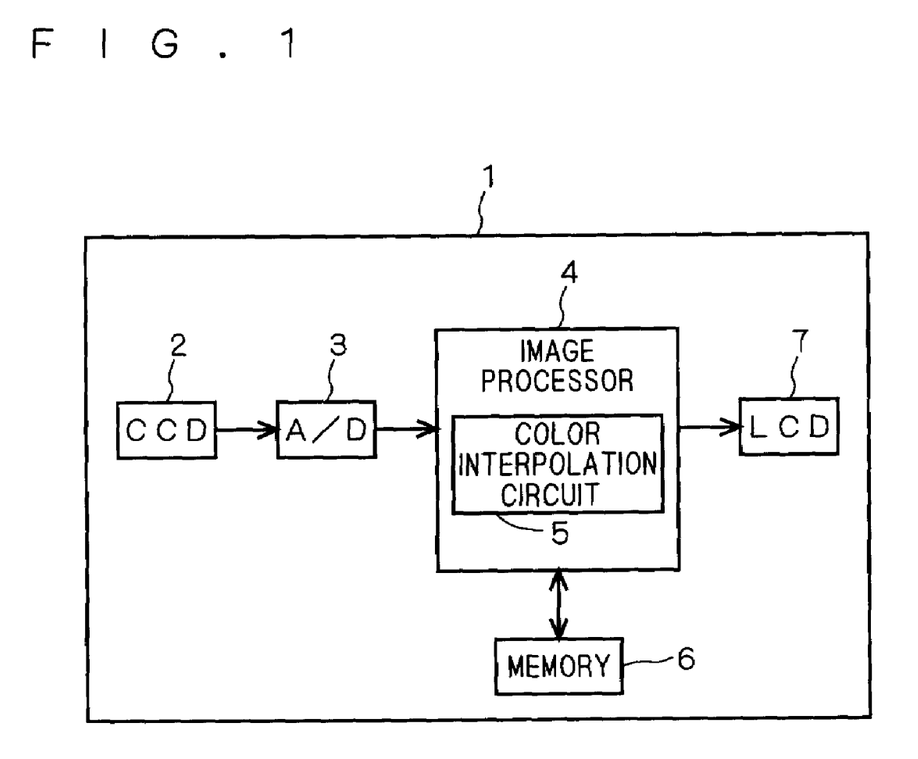
FIG. 1 is a block diagram illustrating a digital camera according to preferred embodiments of the present invention.

Hereinafter, preferred embodiments in the case where a pixel interpolation method of the present invention is applied to a digital camera will be discussed with reference to the accompanied drawings. FIG. 1 is a functional block diagram illustrating a digital camera 1 according to the preferred embodiments of the present invention. The digital camera 1 includes a CCD 2 serving as an imaging sensor, an A/D converter 3, an image processor 4, a memory 6 and an LCD 7. The image processor 4 has a color interpolation circuit 5 to which the pixel interpolation method of the invention is applied.

In the preferred embodiments, the CCD 2 is equipped with a color filter array of RGB Bayer pattern. Accordingly, light entered from a subject is divided into light of each color of RGB by the color filter array of RGB Bayer pattern. Then, light of each color of RGB is photoelectrically converted in each pixel of the CCD 2, and is stored as charge information.

Figure 2:
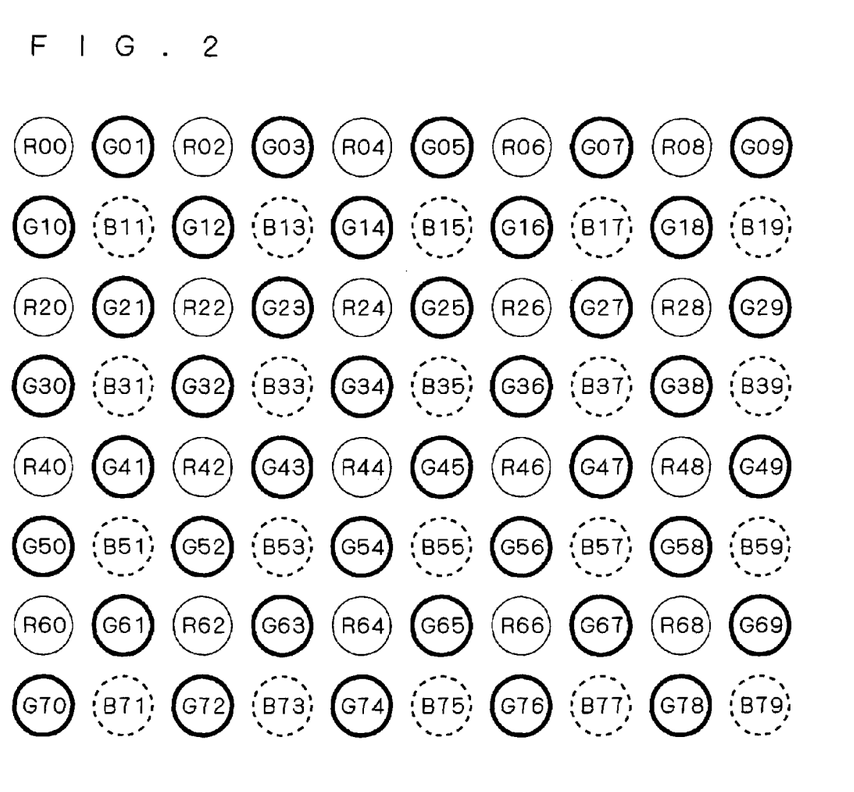
FIG. 2 is a diagram illustrating a general RGB Bayer pattern.

The CCD 2 outputs the stored charge information as an analog image signal. This analog image signal is converted to digital form in the A/D converter 3. The A/D converter 3 outputs an image signal of RGB Bayer pattern. As shown in FIG. 2, the image signal output from the A/D converter 3 contains alternately a horizontal line in which an R (red) signal and a G (green) signal are output alternately and a horizontal line in which a G signal and a B (blue) signal are output alternately.

In the preferred embodiments, the image signal output from the CCD 2 is an image signal of RGB Bayer pattern, however, the pixel interpolation method according to the present invention is applicable to various types of image signals such as an image signal output from an imaging sensor equipped with a complementary color filter array.

The image signal of Bayer pattern output from the A/D converter 3 is input to the image processor 4, and is subjected to color interpolation processing in the color interpolation circuit 5. In this color interpolation processing, a pixel interpolation method which will be discussed later is adopted. Then, the image signal is converted to an image signal containing a signal having RGB color components per pixel. Thereafter, after performing another kind of correction, compression and the like, the image signal is stored in the memory 6, or alternatively, is output to the LCD 7.

First Preferred Embodiment

Processing on Pixel Array of General RGB Bayer Pattern

A pixel interpolation method according to a first preferred embodiment of the present invention will be described. In the present embodiment, a pixel signal output from the CCD 2 is a pixel signal of general RGB Bayer pattern as shown in FIG. 2.

As to two-digit numbers following the characters R (red), G (green) and B (blue) respectively representing color components shown in FIG. 2, the first digit denotes the row number of pixel array, and the second digit denotes the column number of pixel array. In this example, each even-numbered line is a line in which an R pixel and a B pixel are read out alternately like RGRG, and each odd-numbered line is a line in which a G pixel and a B pixel are read out alternately like GBGB.

Figure 3:
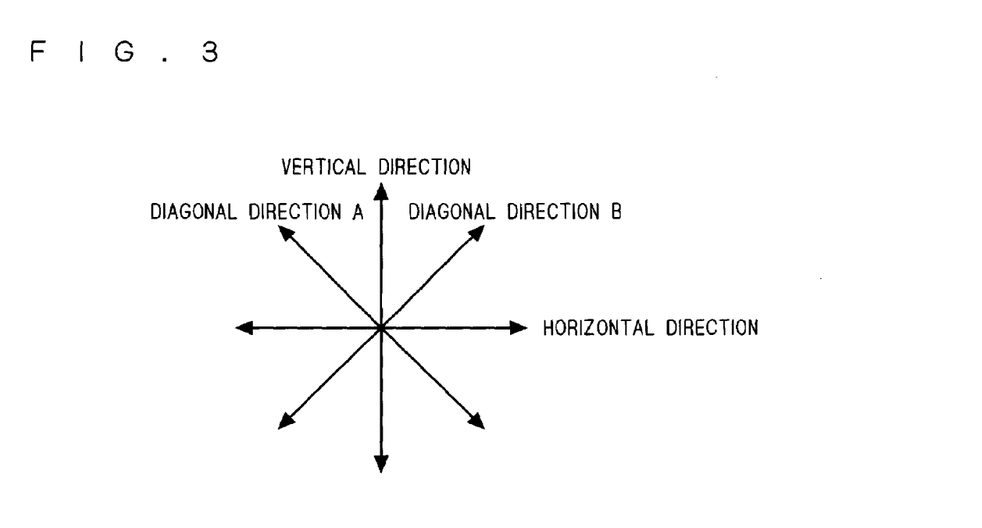
FIG. 3 is a diagram illustrating four directions in which correlations are to be calculated.

FIG. 3 is a diagram illustrating four directions in which correlations are to be evaluated in the pixel array shown in FIG. 2. In the present embodiment, two pairs of two directions perpendicular to each other are used. The first pair is formed by the vertical direction (column direction) and the horizontal direction (row direction) perpendicular to each other, and the second pair is formed by diagonal directions A and B perpendicular to each other. In the present embodiment, the diagonal direction A is inclined counterclockwise at 45 degrees relative to the vertical direction, and the diagonal direction B is inclined clockwise at 45 degrees relative to the vertical direction.

In FIG. 2 and FIGS. 4A to 4D through FIGS. 9A to 9D, G signals are circled by heavy solid lines, R signals are circled by thin solid lines, and B signals are circled by broken lines. The indications such as R00 and G01 are used to identify respective pixels in the drawings, but represent pixel values of respective pixels in equations (1) through (20).

Correlation Value Calculation Method

FIGS. 4A to 4D are diagrams illustrating a method of calculating correlation values when a target pixel represents a G signal (G22 in this example). In the present embodiment, G signals of a 5×5 peripheral region including the target pixel at the center are subjected to correlation value calculation, however, the peripheral region is not limited to a specific range. A 7×7 matrix region may be used instead.

Figure 4A:
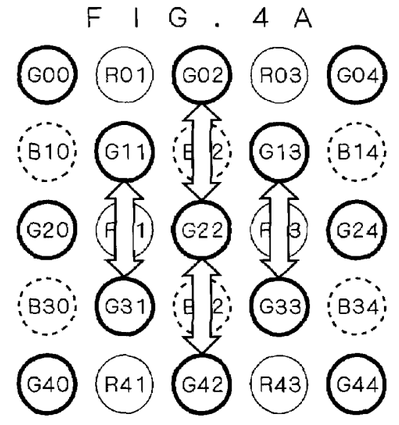
FIGS. 4A to 4D are diagrams illustrating a method of calculating correlations in four directions when a target pixel represents a G signal.

FIG. 4A illustrates the method of calculating a correlation value in the vertical direction, Cvertical, obtained by the equation (1).

$$Cvertical = \frac{|G11 - G31| + |G02 - G22| + |G22 - G42| + |G13 - G33|}{4} \quad (1)$$

More specifically, four pairs of pixel difference absolute values in the vertical direction are calculated using pixel values of seven G signals (G11, G31, G02, G22, G42, G13 and G33), and an average of these absolute values is taken as the correlation value Cvertical. The smaller the correlation value Cvertical, the stronger the correlation in the vertical direction.

Figure 4B:
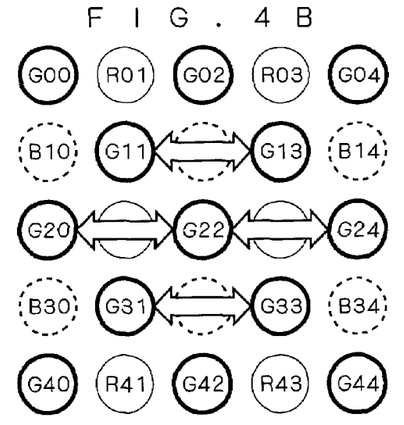

FIG. 4B illustrates the method of calculating a correlation value in the horizontal direction, Chorizontal, obtained by the equation (2).

$$Chorizontal = \quad (2)$$
$$\frac{|G11 - G13| + |G20 - G22| + |G22 - G24| + |G31 - G33|}{4}$$

More specifically, four pairs of pixel difference absolute values in the horizontal direction are calculated using pixel values of seven G signals (G11, G13, G20, G22, G24, G31 and G33), and an average of these absolute values is taken as the correlation value Chorizontal. The smaller the correlation value Chorizontal, the stronger the correlation in the horizontal direction.

Figure 4C:
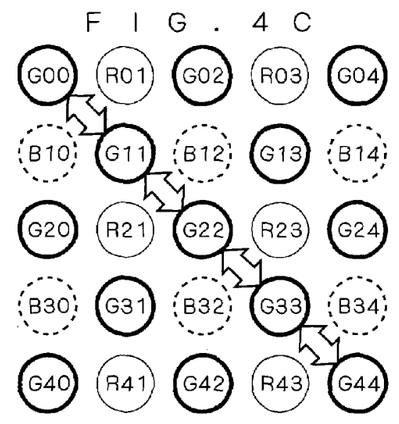

FIG. 4C illustrates the method of calculating a correlation value in the diagonal direction A, CdiagonalA, obtained by the equation (3).

$$CdiagonalA = \quad (3)$$
$$\frac{|G00 - G11| + |G11 - G22| + |G22 - G33| + |G33 - G44|}{4}$$

More specifically, four pairs of pixel difference absolute values in the diagonal direction A are calculated using pixel values of five G signals (G00, G11, G22, G33 and G44), and an average of these absolute values is taken as the correlation value CdiagonalA. The smaller the correlation value CdiagonalA, the stronger the correlation in the diagonal direction A.

Figure 4D:
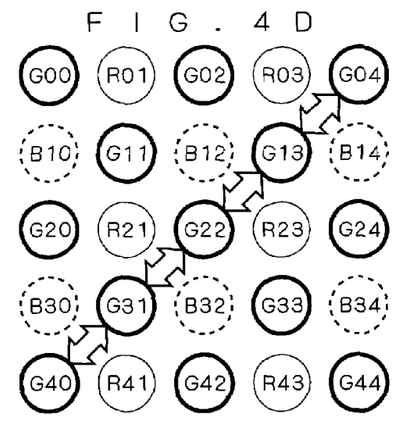

FIG. 4D illustrates the method of calculating a correlation value in the diagonal direction B, CdiagonalB, obtained by the equation (4).

$$CdiagonalB = \quad (4)$$
$$\frac{|G04 - G13| + |G13 - G22| + |G22 - G31| + |G31 - G40|}{4}$$

More specifically, four pairs of pixel difference absolute values in the diagonal direction B are calculated using pixel values of five G signals (G04, G13, G22, G31 and G40), and an average of these absolute values is taken as the correlation value CdiagonalB. The smaller the correlation value CdiagonalB, the stronger the correlation in the diagonal direction B.

FIGS. 5A to 5D are diagrams illustrating a method of calculating correlation values when a target pixel represents an R signal (R22 in this example). In the present embodiment, G signals of a 5×5 peripheral region including the target pixel at the center are subjected to correlation value calculation, however, the peripheral region is not limited to such specific range. A 3×3 or 7×7 matrix region may be used instead.

Figure 5A:
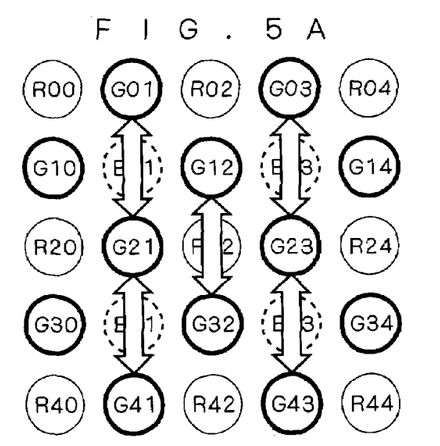
FIGS. 5A to 5D are diagrams illustrating a method of calculating correlations in four directions when a target pixel represents an R signal.

FIG. 5A illustrates the method of calculating a vertical correlation value, Cvertical, obtained by the equation (5).

$$Cvertical = \frac{|G01 - G21| + |G21 - G41| + |G12 - G32| + |G03 - G23| + |G23 - G43|}{5} \quad (5)$$

More specifically, five pairs of pixel difference absolute values in the vertical direction are calculated using pixel values of eight G signals (G01, G21, G41, G12, G32, G03, G23 and G43), and an average of these absolute values is taken as the correlation value Cvertical. The smaller the correlation value Cvertical, the stronger the correlation in the vertical direction.

Figure 5B:
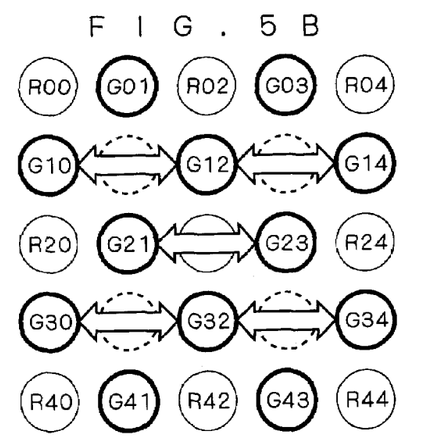

FIG. 5B illustrates the method of calculating a horizontal correlation value, Chorizontal, obtained by the equation (6).

$$Chorizontal = \frac{|G10 - G12| + |G12 - G14| + |G21 - G23| + |G30 - G32| + |G32 - G34|}{5} \quad (6)$$

More specifically, five pairs of pixel difference absolute values in the horizontal direction are calculated using pixel values of eight G signals (G10, G12, G14, G21, G23, G30, G32 and G34), and an average of these absolute values is taken as the correlation value Chorizontal. The smaller the correlation value Chorizontal, the stronger the correlation in the horizontal direction.

Figure 5C:
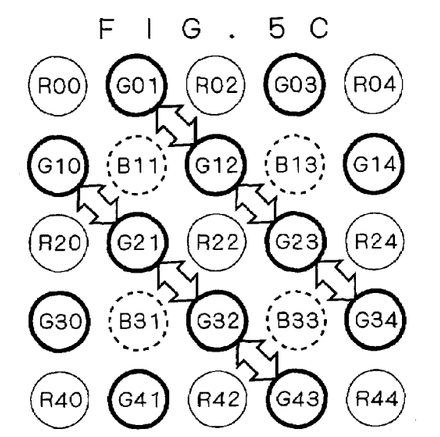

FIG. 5C illustrates the method of calculating a correlation value in the diagonal direction A, CdiagonalA, obtained by the equation (7).

$$CdiagonalA = \frac{|G10 - G21| + |G21 - G32| + |G32 - G43| + |G01 - G12| + |G12 - G23| + |G23 - G34|}{6} \quad (7)$$

More specifically, six pairs of pixel difference absolute values in the diagonal direction A are calculated using pixel values of eight G signals (G10, G21, G32, G43, G01, G12, G23 and G34), and an average of these absolute values is taken as the correlation value CdiagonalA. The smaller the correlation value CdiagonalA, the stronger the correlation in the diagonal direction A.

Figure 5D:
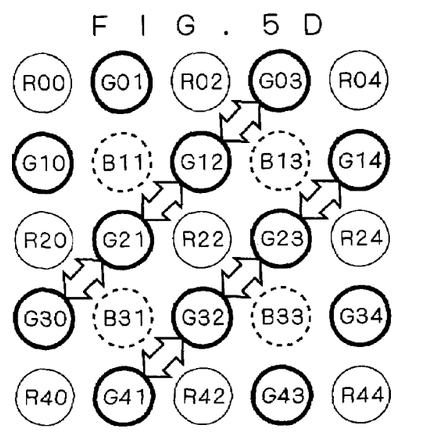

FIG. 5D illustrates a method of calculating a correlation value in the diagonal direction B, CdiagonalB, obtained by the equation (8).

$$CdiagonalB = \frac{|G03 - G12| + |G12 - G21| + |G21 - G30| + |G14 - G23| + |G23 - G32| + |G32 - G41|}{6} \quad (8)$$

More specifically, six pairs of pixel difference absolute values in the diagonal direction B are calculated using pixel values of eight G signals (G03, G12, G21, G30, G14, G23, G32 and G41), and an average of these absolute values is taken as the correlation value CdiagonalB. The smaller the correlation value CdiagonalB, the stronger the correlation in the diagonal direction B.

A pixel interpolation method when a target pixel represents a B signal is similar to that when a target pixel represents an R signal. More specifically, by replacing R signals by B signals in FIGS. 5A to 5D and using the equations (5) to (8), correlation values in the horizontal direction, vertical direction, diagonal direction A and diagonal direction B are obtained, so that correlations in the respective directions can be evaluated.

Next, three methods of evaluating correlations in the four directions from the correlation values in the four directions obtained by the above-described methods to perform pixel interpolation will be described.

First Pixel Interpolation Method

First, a first pixel interpolation method will be described. The first method is to evaluate correlations in the vertical and horizontal directions which form a first pair and correlations in the diagonal directions A and B which form a second pair, and select either pair having a greater correlation difference.

In each pair, an absolute value of difference between two correlation values, which is also called hereinafter "a difference absolute value", is calculated. More specifically, in the first pair, an absolute value of difference |Cvertical−Chorizontal| between the correlation value in the vertical direction, Cvertical, and the correlation value in the horizontal direction, Chorizontal, is calculated. In the second pair, an absolute value of difference |CdiagonalA−CdiagonalB| between the correlation value in the diagonal direction A, CdiagonalA, and the correlation value in the diagonal direction B, CdiagonalB, is calculated. Then, the two difference absolute values are compared in size, and either pair having a larger difference absolute value is selected as a pair having a greater correlation difference, which is called hereinafter "a deviated-correlation pair."

For instance, when Cvertical=20, Chorizontal=10, CdiagonalA=10 and CdiagonalB=5, the relation |20−10|>|10−5| holds, and therefore, the first pair is elected as a deviated-correlation pair.

Following determination of the deviated-correlation pair, either direction in the deviated-correlation pair having a stronger correlation is selected. In the first pair selected in the above example, the correlation value in the vertical direction Cvertical=20 and the correlation value in the horizontal direction Chorizontal=10, and therefore, a direction having a stronger correlation, i.e., the horizontal direction having a smaller correlation value is selected.

As described above, a pair having a greater correlation difference is selected as a deviated-correlation pair, and a direction having a stronger correlation is selected in the deviated-correlation pair, then, pixel interpolation is performed in the direction having a stronger correlation. More specifically, when a target pixel represents a G signal as shown in FIGS. 4A to 4D, an R or a B signal is interpolated at the target pixel using pixels of the same color present in the selected direction. When a target pixel represents an R signal as shown in FIGS. 5A to 5D, a G or a B signal is interpolated at the target pixel using pixels of the same color present in the selected direction. Similarly, when a target pixel represents a B signal, a G or an R signal is interpolated at the target pixel using pixels of the same color present in the selected direction.

When pixels of a color component to be interpolated are present on a line along which interpolation is to be performed, pixel interpolation can be executed by taking an average or performing linear interpolation. However, there may be a case where no pixel having a color component to be interpolated is present on a line along which interpolation is to be performed depending on the pixel array. In such case, a method shall be employed which estimates a value of a pixel at which interpolation is to be performed on the basis of the rate of change (Laplacian) in a direction perpendicular to the line along which interpolation is to be performed. However, the interpolation method is not limited specifically, provided that the above-described evaluation of correlations according to the present invention is considered.

In the above example in which Cvertical=20, Chorizontal=10, CdiagonalA=10 and CdiagonalB=5, the first pair is selected, and then, the horizontal direction is selected. Accordingly, when the target pixel represents a G signal, an R signal is interpolated at the target pixel using R signals present in the horizontal direction, and a B signal is interpolated at the target pixel using B signals present in the horizontal direction (i.e., B signals estimated considering the rate of change in the vertical direction as described above since there is no B signal present on the horizontal line). Similarly, when the target pixel represents an R signal, a B signal is interpolated at the target pixel using B signals present in the horizontal direction (i.e., B signals estimated considering the rate of change in the vertical direction as described above since there is no B signal present on the horizontal line), and a G signal is interpolated at the target pixel using G signals present in the horizontal direction. When the target pixel represents a B signal, an R signal is interpolated at the target pixel using R signals present in the horizontal direction (i.e., R signals estimated considering the rate of change in the vertical direction as described above since there is no R signal present on the horizontal line), and a G signal is interpolated at the target pixel using G signals present in the horizontal direction. Pixel interpolation may be performed in both two directions included in a deviated-correlation pair.

Second Pixel Interpolation Method

Next, the second pixel interpolation method will be described. Similarly to the above-described first pixel interpolation method, one of the first and second pairs is also selected as a deviated-correlation pair in this second method. Then, the second method uses correlations in the two directions included in the selected deviated-correlation pair. More specifically, the two directions included in the selected deviated-correlation pair are assigned weights in a proportion based on their correlations, thereby performing pixel interpolation taking into account pixel variations in the two directions.

In the above example, in the first pair selected as a deviated-correlation pair, Cvertical=20 and Chorizontal=10, and the ratio between the correlation values is 2/3:1/3. Thus, the ratio between correlations becomes 1/3:2/3. Assuming that a pixel value obtained by performing interpolation at the target pixel in the vertical direction is P1 and a pixel value obtained by performing interpolation in the horizontal direction is P2, the pixel value of the target pixel shall be obtained as P1×1/3+ P2×2/3 by assigning weights in the proportion based on the correlations. This allows interpolation to be performed with high accuracy taking into account the correlations in both the vertical and horizontal directions.

Denoting correlations in two directions X and Y included in a selected deviated-correlation pair by CX and CY, respectively (calculated similarly to the method described referring to equations (1) to (8)), and pixel values obtained by pixel interpolation in the directions X and Y by PX and PY, respectively, the proportion of correlations in the two directions X and Y is generally obtained by the expression (9).

$$\frac{CY}{CX+CY} : \frac{CX}{CX+CY} \qquad (9)$$

Therefore, an interpolated pixel value is obtained by the expression (10) by assigning weights in the proportion of correlations in the two directions X and Y.

$$PX \cdot \frac{CY}{CX+CY} + PY \cdot \frac{CX}{CX+CY} \qquad (10)$$

Figure 10A:
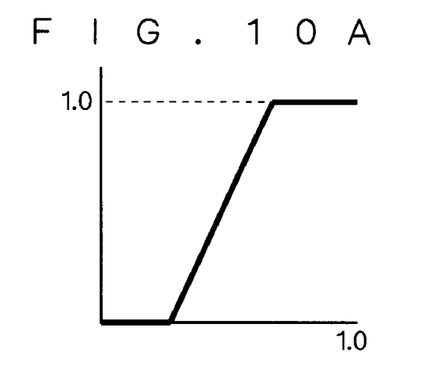
FIGS. 10A and 10B are diagrams each illustrating a function of calculating a weighting coefficient.
Figure 10B:
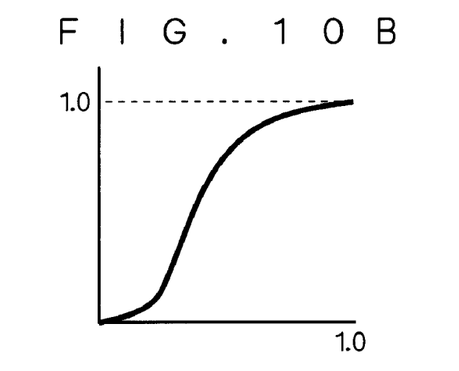

In the above example, the proportion of correlations is used as a weighting coefficient to carry out simple proportional distribution in accordance with the correlations, however, a function as shown in FIG. 10A or 10B may be used instead to calculate a weighting coefficient. In the drawings, the horizontal axis indicates the proportion of correlations (corresponding to the weighting coefficient in carrying out the simple proportional distribution), and the vertical axis indicates the value of weighting coefficient determined by each function.

As shown, each function of obtaining a weighting coefficient is not a simple linear function but is defined to have a different inclination depending on a region representing the proportion of correlations. In other words, a different function shall be applied depending on the proportion of correlations. The inclinations in the respective regions shown in FIGS. 10A and 10B are only illustrative examples, and the function in each region may be set freely.

When using either of the functions as shown in FIGS. 10A and 10B, values of the function may previously be stored in a ROM as a look up table (LUT), or a formula for the function may be executed as software processing.

Third Pixel Interpolation Method

Next, the third pixel interpolation method will be described. This method is to perform pixel interpolation by assigning weights in all the four directions in accordance with the proportion of correlations in the four directions obtained by the above method.

In the above example where Cvertical=20, Chorizontal=10, CdiagonalA=10 and CdiagonalB=5, the proportion of correlation values is 20/45:10/45:10/45:5/45. The proportion of correlations is therefore expressed as 25/45:35/45:35/45: 40/45. This method of calculating the proportion of correlations is only an illustrative example, and another example will be described later.

Assuming that a pixel value obtained by performing interpolation at the target pixel in the vertical direction is P1, a pixel value obtained by performing interpolation in the horizontal direction is P2, a pixel value obtained by performing interpolation in the diagonal direction A is P3 and a pixel value obtained by performing interpolation in the diagonal direction B is P4, the pixel value of the target pixel shall be obtained as (P1×25/45+P2×35/45+P3×35/45+P4×40/45)/3 by assigning weights in accordance with the proportion of correlations. This allows interpolation to be performed with high accuracy taking into account the correlations in the four directions, i.e., vertical direction, horizontal direction, diagonal direction A and diagonal direction B.

Denoting correlations in directions X, Y, Z and Ω by CX, CY, CZ and CΩ, respectively (calculated similarly to the method described referring to equations (1) to (8)), and pixel values obtained by pixel interpolation in the directions X, Y, Z and Ω by PX, PY, PZ and PΩ, respectively, the proportion of correlations in the four directions X, Y, Z and Ω is generally obtained by the expression (11).

$$\frac{CY+CZ+C\Omega}{CX+CY+CZ+C\Omega} : \frac{CX+CZ+C\Omega}{CX+CY+CZ+C\Omega} : \\ \frac{CX+CY+C\Omega}{CX+CY+CZ+C\Omega} : \frac{CX+CY+CZ}{CX+CY+CZ+C\Omega} \quad (11)$$

Therefore, an interpolated pixel value is obtained by the expression (12) by assigning weights in accordance with the proportion of correlations in the four directions X, Y, Z and Ω.

$$\left( PX \cdot \frac{CY+CZ+C\Omega}{CX+CY+CZ+C\Omega} + PY \cdot \frac{CX+CZ+C\Omega}{CX+CY+CZ+C\Omega} + \\ PZ \cdot \frac{CX+CY+C\Omega}{CX+CY+CZ+C\Omega} + P\Omega \cdot \frac{CX+CY+CZ}{CX+CY+CZ+C\Omega} \right) \Big/ 3 \quad (12)$$

As the method of calculating a weighting coefficient, the function as shown in FIG. 10A or 10B may also be used in the present third method.

As another method of obtaining the proportion of correlations, an inverse proportion of correlation values may be used. More specifically, when Cvertical=20, Chorizontal=10, CdiagonalA=10 and CdiagonalB=5, the proportion of correlation values is 20:10:10:5. Therefore, the proportion of correlations shall be an inverse proportion, 1/20:1/10:1/10:1/5, i.e., 1/9:2/9:2/9:4/9.

Alternatively, still another method of obtaining the proportion of correlations is to consider a correlation difference rate. More specifically, the proportions of correlations in the respective pairs are 10/30:20/30 and 5/15:10/15, and the correlation difference rate between the pairs is |20−10|:|10−5|, i.e., 2/3:1/3. Thus, the proportions of correlations in the pairs are multiplied by the correlation difference rate to be 10/30× 2/3:20/30×2/3:5/15×1/3:10/15×1/3, i.e., 2/9:4/9:1/9:2/9. In this method, nonlinear characteristics shown in FIG. 10A or 10B may be applied to each of the correlation coefficient and correlation difference rate.

Second Preferred Embodiment

Processing on Pixel Array of RGB Bayer Pattern Turned 45 Degrees

Figure 6:
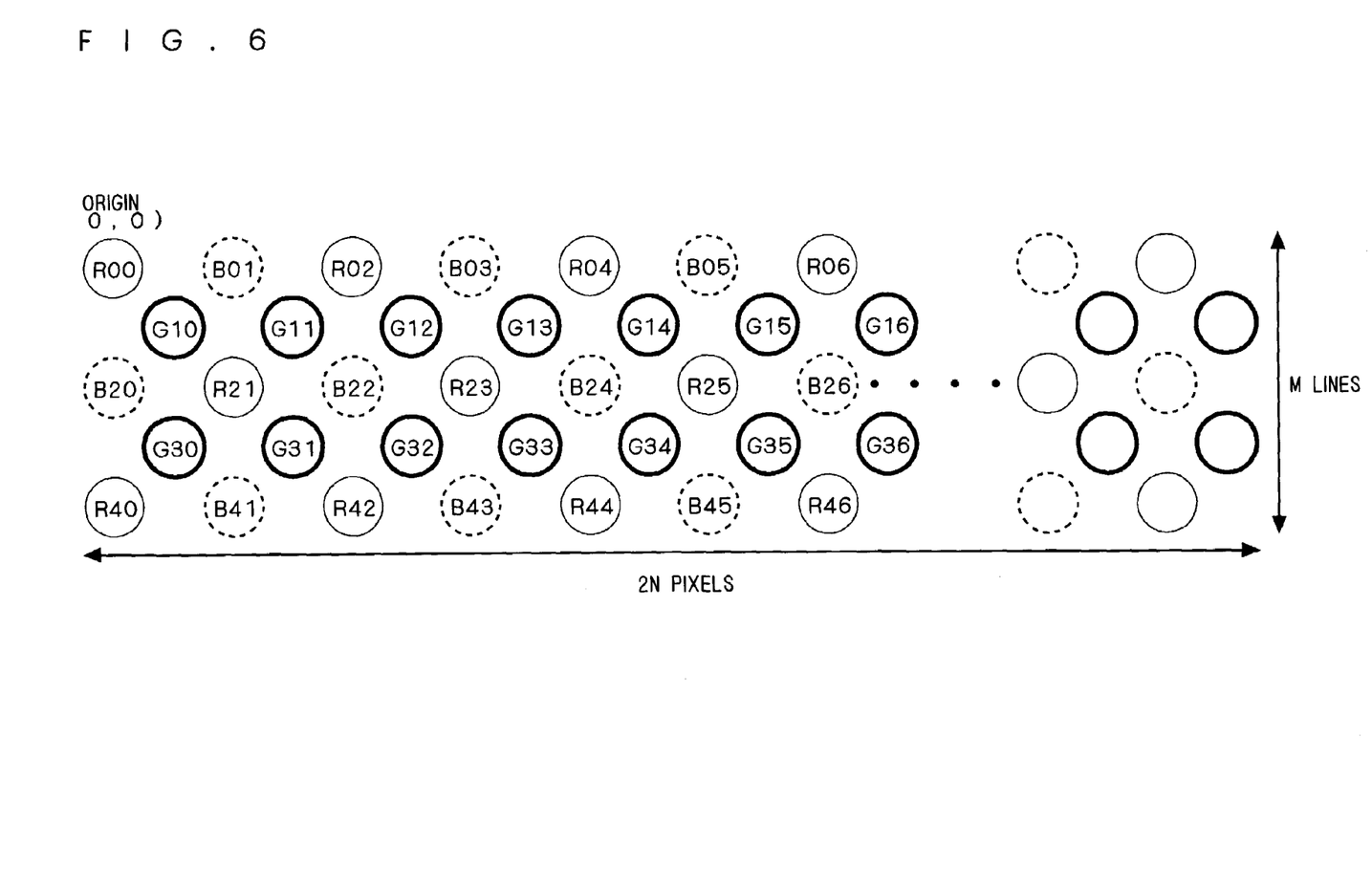
FIG. 6 is a diagram illustrating an RGB Bayer pattern arranged at 45 degrees.

A pixel interpolation method according to a second preferred embodiment of the present invention will be described. The CCD 2 according to the present embodiment has a pixel array as shown in FIG. 6. More specifically, the general RGB Bayer pattern shown in FIG. 2 is turned 45 degrees. For instance, CCDs having such pixel array are known as honeycomb CCDs.

Figure 7:
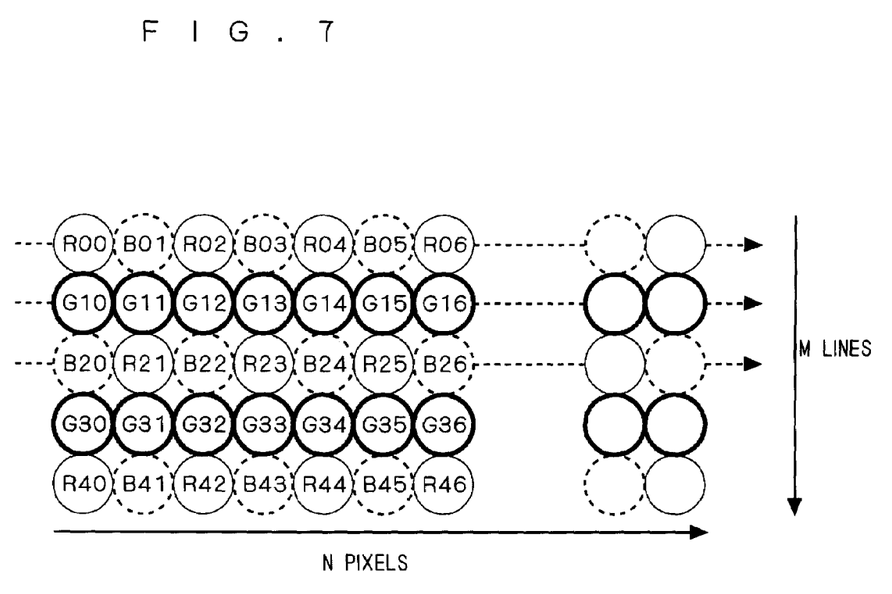
FIG. 7 is a diagram illustrating an output pattern of pixel signals shown in FIG. 6.

A pixel signal output from the CCD 2 is a pixel signal having an array as shown in FIG. 7. In this example, an R (red) pixel and a B (blue) pixel are read out alternately like RBRB in each even-numbered line, and G (green) pixels are continuously read out like GGGG in each odd-numbered line. In this manner, the output signal arrangement differs from that of the first preferred embodiment, and therefore, a method is employed which is different from that described in the first preferred embodiment.

In the present embodiment, two pairs of correlated directions perpendicular to each other are also used as shown in FIG. 3.

Correlation Value Calculation Method

FIGS. 8A to 8D are diagrams illustrating a method of calculating correlation values when a target pixel represents a G signal (G22 in this example). In the present embodiment, G signals included in a 3×3 peripheral region centering at the target pixel are subjected to correlation value calculation, however, the peripheral region is not limited to such specific range. A 5×5 or 7×7 matrix region may be used instead.

Figure 8A:
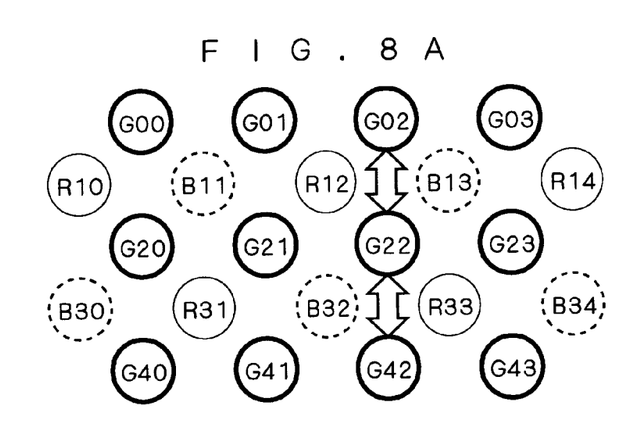
FIGS. 8A to 8D are diagrams illustrating a method of calculating correlations in our directions when a target pixel represents a G signal.

FIG. 8A illustrates the method of calculating a correlation value in the vertical direction, Cvertical, obtained by the equation (13).

$$Cvertical = \frac{|G02-G22|+|G22-G42|}{2} \quad (13)$$

More specifically, two pairs of pixel difference absolute values in the vertical direction are calculated using pixel values of three G signals (G02, G22 and G42), and an average of these absolute values is taken as the correlation value Cvertical. The smaller the correlation value Cvertical, the stronger the correlation in the vertical direction.

Figure 8B:
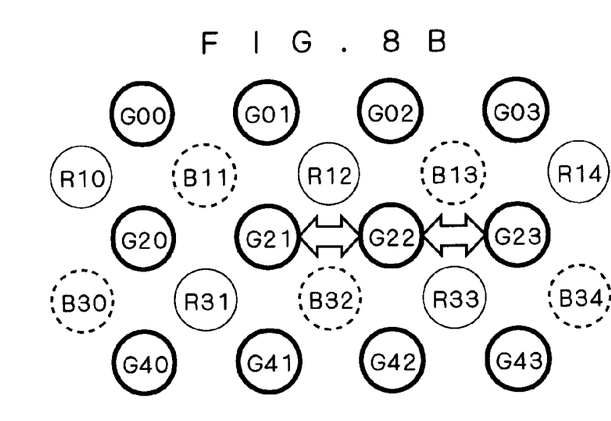

FIG. 8B illustrates the method of calculating a correlation value in the horizontal direction, Chorizontal, obtained by the equation (14).

$$Chorizontal = \frac{|G21-G22|+|G22-G23|}{2} \quad (14)$$

More specifically, two pairs of pixel difference absolute values in the horizontal direction are calculated using pixel values of three G signals (G32, G22 and G23), and an average of these absolute values is taken as the correlation value Chorizontal. The smaller the correlation value Chorizontal, the stronger the correlation in the horizontal direction.

Figure 8C:
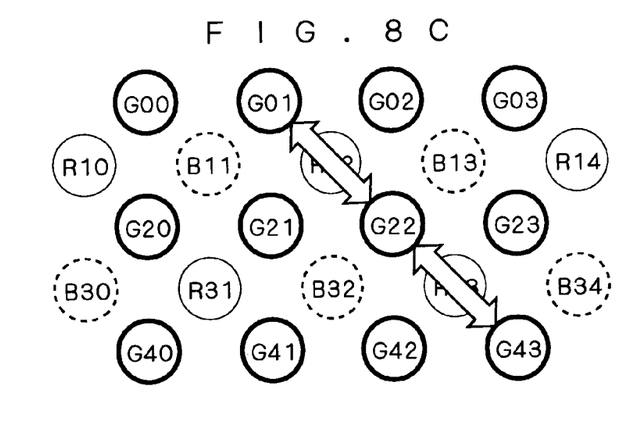

FIG. 8C illustrates the method of calculating a correlation value in the diagonal direction A, CdiagonalA, obtained by the equation (15).

$$CdiagonalA = \frac{|G01-G22|+|G22-G43|}{2} \quad (15)$$

More specifically, two pairs of pixel difference absolute values in the diagonal direction A are calculated using pixel values of three G signals (G01, G22 and G43), and an average of these absolute values is taken as the correlation value CdiagonalA. The smaller the correlation value CdiagonalA, the stronger the correlation in the diagonal direction A.

Figure 8D:
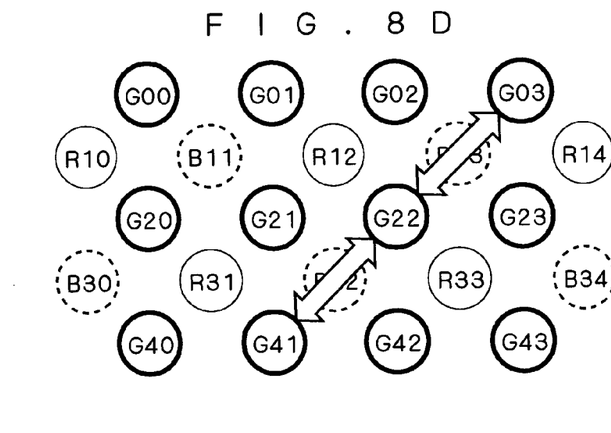

FIG. 8D illustrates the method of calculating a correlation value in the diagonal direction B, CdiagonalB, obtained by the equation (16).

$$CdiagonalB = \frac{|G03-G22|+|G22-G41|}{2} \quad (16)$$

More specifically, two pairs of pixel difference absolute values in the diagonal direction B are calculated using pixel values of three G signals (G03, G22 and G41), and an average of these absolute values is taken as the correlation value CdiagonalB. The smaller the correlation value CdiagonalB, the stronger the correlation in the diagonal direction B.

FIGS. 9A to 9D are diagrams illustrating a method of calculating correlation values when a target pixel represents a B signal (B22 in this example). In the present embodiment, G signals included in a 2×4 peripheral region centering at the target pixel are subjected to correlation value calculation, however, the peripheral region is not limited to such specific range.

Figure 9A:
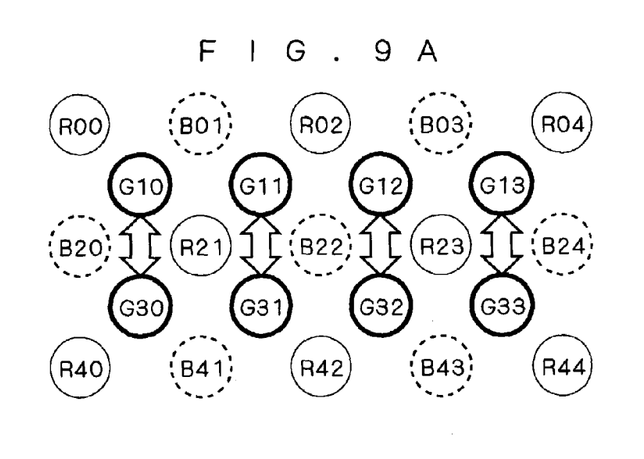
FIGS. 9A to 9D are diagrams illustrating a method of calculating correlations in four directions when a target pixel represents a B signal.

FIG. 9A illustrates the method of calculating a vertical correlation value, Cvertical, obtained by the equation (17).

$$Cvertical = \frac{|G10 - G30| + |G11 - G32| + |G12 - G32| + |G13 - G33|}{4} \quad (17)$$

More specifically, four pairs of pixel difference absolute values in the vertical direction are calculated using pixel values of eight G signals (G10, G11, G12, G13, G30, G31, G32 and G33), and an average of these absolute values is taken as the correlation value Cvertical. The smaller the correlation value Cvertical, the stronger the correlation in the vertical direction.

Figure 9B:
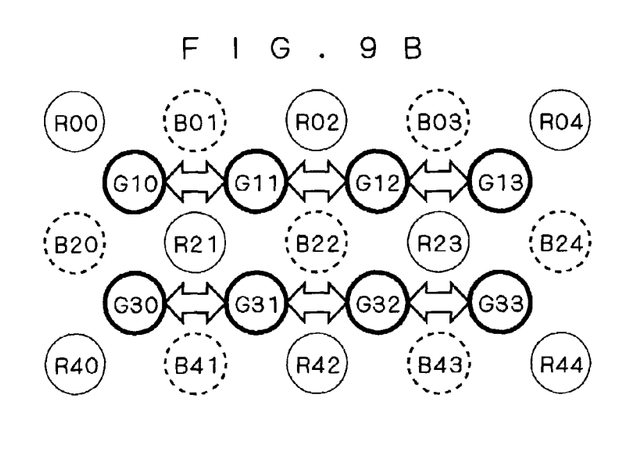

FIG. 9B illustrates the method of calculating a horizontal correlation value, Chorizontal, obtained by the equation (18).

$$Chorizontal = \frac{|G10 - G11| + |G11 - G12| + |G12 - G13| + |G30 - G31| + |G31 - G32| + |G32 - G33|}{6} \quad (18)$$

More specifically, six pairs of pixel difference absolute values in the horizontal direction are calculated using pixel values of eight G signals (G10, G11, G12, G13, G30, G31, G32 and G33), and an average of these absolute values is taken as the correlation value Chorizontal. The smaller the correlation value Chorizontal, the stronger the correlation in the horizontal direction.

Figure 9C:
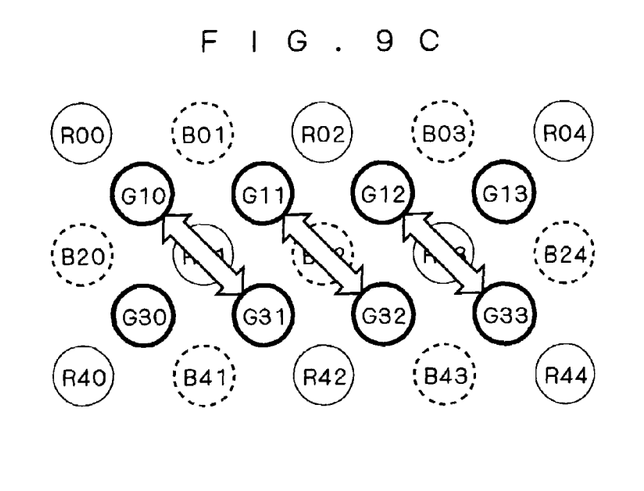

FIG. 9C illustrates the method of calculating a correlation value in the diagonal direction A, CdiagonalA, obtained by the equation (19).

$$CdiagonalA = \frac{|G10 - G31| + |G11 - G32| + |G12 - G33|}{3} \quad (19)$$

More specifically, three pairs of pixel difference absolute values in the diagonal direction A are calculated using pixel values of six G signals (G10, G11, G12, G31, G32 and G33), and an average of these absolute values is taken as the correlation value CdiagonalA. The smaller the correlation value CdiagonalA, the stronger the correlation in the diagonal direction A.

Figure 9D:
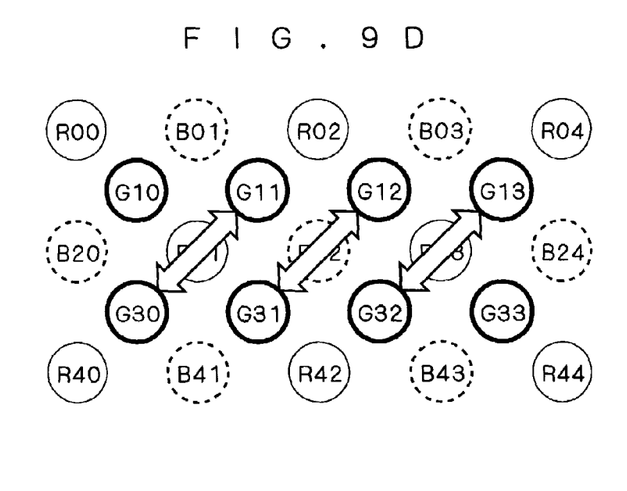

FIG. 9D illustrates a method of calculating a correlation value in the diagonal direction B, CdiagonalB, obtained by the equation (20).

$$CdiagonalB = \frac{|G11 - G30| + |G12 - G31| + |G13 - G32|}{3} \quad (20)$$

More specifically, three pairs of pixel difference absolute values in the diagonal direction B are calculated using pixel values of six G signals (G11, G12, G13, G30, G31 and G32), and an average of these absolute values is taken as the correlation value CdiagonalB. The smaller the correlation value CdiagonalB, the stronger the correlation in the diagonal direction B.

A pixel interpolation method when a target pixel represents an R signal is similar to that when a target pixel represents a B signal. More specifically, by replacing B signals by R signals in FIGS. 9A to 9D and using the equations (17) to (20), correlations in the vertical direction, horizontal direction, diagonal direction A and diagonal direction B are obtained, so that correlations in the respective directions can be obtained.

Following calculation of four correlation values (Cvertical, Chorizontal, CdiagonalA and CdiagonalB) in the vertical direction, horizontal direction, diagonal direction A and diagonal direction B by the above-described method, pixel interpolation can be performed by methods similar to the three pixel interpolation methods described in the first preferred embodiment. More specifically, the first method is to select a deviated-correlation pair, and to select a direction having a stronger correlation in the deviated-correlation pair. The second method is to select a deviated-correlation pair, and to assign weights in the two directions of the deviated-correlation pair in accordance with the proportion of correlations to perform pixel interpolation. The third method is to assign weights in the four directions in accordance with the proportion of correlations to perform pixel interpolation.

Variant

In the above preferred embodiments, directions respectively inclined at 45 degrees relative to the vertical direction are selected as the diagonal directions A and B, however, this is only an illustrative example. The diagonal directions A and B may be inclined at any angle relative to the vertical direction, provided that they are perpendicular to each other.

Further, correlation values are obtained for G signals in the above preferred embodiments. In the case where pixel data to be input is data containing a luminance signal, however, it is preferable that correlation values be obtained using the luminance signal. However, a pixel component for which correlation values are to be obtained in the pixel interpolation method according to the present invention is not limited to a G signal or a luminance signal, but correlation values may be obtained using another color component.

Furthermore, when evaluating correlation values, comparison may be made with a threshold value. In the present embodiment, as described above, correlation values are calculated in the vertical direction, horizontal direction, diagonal direction A and diagonal direction B. Then, the respective correlation values are compared with a predetermined threshold value. Thereafter, in the third pixel interpolation method of performing pixel interpolation in the four directions, pixel interpolation may be performed only in a direction having a correlation value lower than the threshold value (i.e., a direction having a strong correlation). When correlation values in all the directions exceed the threshold value (i.e., when none of the directions has a strong correlation), pixel interpolation methods may be changed by, for example, selecting median interpolation or average value interpolation, according to the circumstances.

While the invention has been shown and described in detail, the foregoing description is in all aspects illustrative and not restrictive. It is therefore understood that numerous modifications and variations can be devised without departing from the scope of the invention.

What is claimed is:

1. A pixel interpolation method comprising:
inputting pixel data of a predetermined color space;
obtaining respective correlations of a target pixel present in first-fourth directions, said second direction perpendicular to said first direction, said third direction different from said first and second directions and said fourth direction perpendicular to said third direction, using neighboring pixels around said target pixel; and
performing pixel interpolation at said target pixel in two of said first to fourth directions perpendicular to each other using proportions of two of said correlations corresponding to said two directions with respect to each other.

2. A pixel interpolation method comprising:
inputting pixel data of a predetermined color space;
obtaining a correlation of a pixel present in a first direction, a correlation of a pixel present in a second direction perpendicular to said first direction, a correlation of a pixel present in a third direction different from said first and second directions and a correlation of a pixel present in a fourth direction perpendicular to said third direction, using neighboring pixels around a target pixel; and
performing pixel interpolation at said target pixel in at least one of said first to fourth directions using said four correlations in said first to fourth directions,
wherein
said performing step includes the step of evaluating correlations of a peripheral region of said target pixel using said four correlations in said first to fourth directions, thereby performing said pixel interpolation at said target pixel in at least one of said first to fourth directions judged that said correlation is strong, and
said performing includes the step of performing said pixel interpolation in at least one direction included in a pair of directions having a greater correlation difference between a pair of said first and second directions and a pair of said third and fourth directions.

3. The pixel interpolation method according to claim 2, wherein said performing includes the step of performing pixel interpolation only in a direction having the strongest correlation between directions included in said pair having a greater correlation difference.

4. The pixel interpolation method according to claim 2, wherein said performing includes the step of assigning weights in respective directions included in said pair having a greater correlation difference in accordance with a proportion of said correlations, thereby performing said pixel interpolation.

5. The pixel interpolation method according to claim 1, wherein said pixel data of said predetermined color space contains data having pixels of respective color components included in said predetermined color space arrayed in a Bayer pattern.

6. The pixel interpolation method according to claim 1, wherein said first direction is one of a vertical direction and a horizontal direction, and said third direction is a direction inclined at 45 degrees relative to the vertical direction.

7. The pixel interpolation method according to claim 1, wherein said obtaining includes obtaining each of said correlations for a G signal when said pixel data is of an RGB color space.

8. The pixel interpolation method according to claim 1, wherein said obtaining includes obtaining each of said correlations for a luminance signal when said pixel data is of a predetermined color space containing the luminance signal.

9. The pixel interpolation method according to claim 1, wherein said performing pixel interpolation comprises
determining said first correlation as C1;
determining said second correlation as C2; and
determining said proportions as $$\frac{C1}{C1+C2} \text{ and } \frac{C2}{C1+C2}.$$

10. The pixel interpolation method according to claim 9, wherein P1 is an interpolated value of said target pixel in said first direction and P2 is an interpolated value of said target pixel in said second direction, said performing pixel interpolation comprising:
determining said interpolated value of said target pixel as:

$$P2 \cdot \frac{C1}{C1+C2} + P1 \cdot \frac{C2}{C1+C2}.$$

11. A pixel interpolation method, comprising:
inputting pixel data of a predetermined color space;
obtaining respective correlations of a target pixel present in first-fourth directions as C1-C4, respectively, said second direction perpendicular to said first direction, said third direction different from said first and second directions and said fourth direction perpendicular to said third direction, using neighboring pixels around said target pixel; and
performing pixel interpolation at said target pixel in said first to fourth directions using proportions determined respectively as $$\frac{C2+C3+C4}{C1+C2+C3+C4}, \frac{C1+C3+C4}{C1+C2+C3+C4},$$
$$\frac{C1+C2+C4}{C1+C2+C3+C4} \text{ and } \frac{C1+C2+C3}{C1+C2+C3+C4}.$$

12. A pixel interpolation method, comprising:
inputting pixel data of a predetermined color space;
obtaining respective first-fourth correlations of a target pixel present in first-fourth directions, respectively, said second direction perpendicular to said first direction, said third direction different from said first and second directions and said fourth direction perpendicular to said third direction, using neighboring pixels around said target pixel; and
performing pixel interpolation at said target pixel in said first to fourth directions using correlation proportions respectively inversely proportional to each other.

13. A pixel interpolation method, comprising:
inputting pixel data of a predetermined color space;
obtaining respective first-fourth correlations of a target pixel present in first-fourth directions, respectively, said second direction perpendicular to said first direction, said third direction different from said first and second directions and said fourth direction perpendicular to said third direction, using neighboring pixels around said target pixel;
obtaining a first difference between said first and second correlations, and a second difference between said third and fourth correlations;
determining first and second proportions using said first and second correlations;

determining third and fourth proportions using said third and fourth correlations;

multiplying said first and second proportions by said first difference to give first and second multiplied proportions;

multiplying said third and fourth proportions by said second difference to give third and fourth multiplied proportions; and performing pixel interpolation at said target pixel in said first to fourth directions using said first-fourth multiplied proportions.

14. The pixel method according to claim 13, comprising:

determining said first proportion as said second correlation divided by a sum of said first and second correlations;

determining said second proportion as said first correlation divided by a sum of said first and second correlations;

determining said third proportion as said fourth correlation divided by a sum of said third and fourth correlations; and determining said fourth proportion as said third correlation divided by a sum of said third and fourth correlations.

* * * * *